US006843461B2

(12) United States Patent
Braungardt et al.

(10) Patent No.: US 6,843,461 B2
(45) Date of Patent: Jan. 18, 2005

(54) MOLD FOR PRODUCING DEPRESSIONS IN THE SIDES OF A MOLDED BLOCK

(75) Inventors: Rudolf Braungardt, Pechtelsgrün (DE); Erwin Schmucker, Schelklingen (DE)

(73) Assignee: KOBRA Formen-und Anlagenbau GmbH, Lengenfeld (DE)

( * ) Notice: Subject to any disclaimer, the term of this patent is extended or adjusted under 35 U.S.C. 154(b) by 179 days.

(21) Appl. No.: 10/004,446

(22) Filed: Dec. 5, 2001

(65) Prior Publication Data

US 2002/0125403 A1 Sep. 12, 2002

(30) Foreign Application Priority Data

Mar. 6, 2001 (DE) ........................................ 101 10 651

(51) Int. Cl.[7] ................................................ B29C 33/76

(52) U.S. Cl. ........................... 249/63; 249/64; 249/176; 425/468

(58) Field of Search ................................ 249/170, 171, 249/176, 63, 64; 404/39, 41; 425/468, 442; 264/318, 333

(56) References Cited

U.S. PATENT DOCUMENTS

RE17,020 E * 7/1928 Healy .......................... 404/41
2,050,299 A * 8/1936 Evers .......................... 249/91
3,731,899 A * 5/1973 Nuzzo ......................... 249/142
4,627,764 A * 12/1986 Scheiwiller .................. 404/41
4,761,095 A * 8/1988 Barlechner ................... 404/41
5,409,325 A * 4/1995 Wu ............................. 404/34
5,902,069 A * 5/1999 Barth et al. ................... 404/34
6,079,902 A * 6/2000 Pettee, Jr. .................... 405/35
D431,305 S * 9/2000 Barth et al. ................ D25/113
2003/0007834 A1 * 1/2003 Bolduc et al. ................ 404/41

* cited by examiner

*Primary Examiner*—W. L. Walker
*Assistant Examiner*—Emmanuel S Luk
(74) *Attorney, Agent, or Firm*—Edmund M. Jaskiewicz

(57) ABSTRACT

The side walls of a mold have recesses in each of which is mounted a mold core for forming depressions on the outer side of a concrete block which is to be produced in this mold. The mold cores are pivotally supported around a horizontal axis which is parallel to the mold walls on the outer side of the mold. A sloping cam slot on each mold core is used to pivot the mold cores into the mold cavity defined by the mold walls and then back into the recess. The inner edges of a recess closely fit the mold core and function as strippers which self-clean all surfaces of the mold core which have come into contact with the concrete when the mold core is pivoted back into its recess. As a result, time intervals for cleaning the mold cores are greatly lengthened and a clean and smooth surface of the finished concrete block is insured.

19 Claims, 5 Drawing Sheets

MOLD FOR PRODUCING DEPRESSIONS IN THE SIDES OF A MOLDED BLOCK

BACKGROUND OF THE INVENTION

The present invention relates to a mold for producing molded articles such as concrete blocks, more particularly, to such a mold having one or more mold cores which project into the mold cavity for forming depressions on the outer sides of the molded concrete block.

A concrete block produced with such a mold (see for example German patent DE-AS 1 708 675) has on each of its four sides triangular projections and depressions. When the concrete blocks are assembled to form a surface the triangular projections fit into the corresponding recesses of adjacent concrete blocks. The resulting assembly of interfitting concrete blocks has high vertical and horizontal load supports on all four sides of the assembled concrete blocks. The triangular shapes of the projections and depressions facilitates interconnecting the concrete blocks when they are being laid.

In order to form the triangular depressions in a concrete block, it is known to move a triangular mold core point first linearly into the mold cavity. The mold wall of the mold is provided with a recess through which the mold core projects into the mold cavity. However, such a structure is disadvantageous since when the mold core is retracted back out of the mold cavity concrete residue remains on the mold core and such residues tend to build up and accumulate over a period of time. As a result, the finished concrete block has an irregular surface and there is a very poor dimensional accuracy of the depressions which makes it very difficult to precisely join the concrete blocks when they are being laid. Also, when the molded block is being removed from the mold and when the mold is being lifted irregularities will occur on the outer sides of the finished concrete block when the mold core is in the withdrawn position and concrete residues will adhere to the mold core. The mold cores must therefore be cleaned at relatively short time intervals and significantly increase the costs of the molding operation.

SUMMARY OF THE INVENTION

It is therefore the principal object of the present invention to provide a novel and improved mold for forming depressions in the sides of a concrete block molded therein.

It is another object of the present invention to provide such a mold in which pivotally mounted mold cores are pivoted into the cavity of the mold to form the depression during the molding operation and then withdrawn or retracted into the mold wall.

It is a further object of the present invention to provide such a mold wherein the mold cores are pivotally mounted within a closely fitting recess which provides for self cleaning of the mold cores and thus a smooth and uniform surface is formed on the finished block.

The objects of the present invention are achieved and the disadvantages of the prior art as described above are overcome by the mold of the present invention in which one or more mold cores are pivotally mounted on a horizontal axis within a recess in the side wall of the mold. The mold cores are pivoted into a first position in which they project into the mold cavity to form depressions in the side walls of a concrete block produced therein and then pivoted back or retracted into a second position back into the recess. The air gap or clearance between the inner edges of the recess and the outside contour of the mold core is very close and so dimensioned that the boundary edge acts as a stripper of the mold material when the mold core is pivoted back into the recess.

The mold core preferably has a body with the shape of a cylinder segment with triangular end faces and the horizontal pivoting axis of the mold core is located in the area of the central axis of the cylinder segment. The sides of the end faces opposite the pivoting axis form an arc segment. As a result, when the mold core is pivoted back into the recess all of the surfaces of the mold core which have come into contact with the concrete molding material are stripped and cleaned on the inner edges of the recesses in the mold wall.

In order to make the depressions in the concrete block somewhat triangular, the end faces of the mold core are beveled in the area of the arc segments so that arches with the shape of a truncated cone segment are formed on the two end faces. This enables the concrete blocks to be readily joined together when they are being laid. Preferably the angle at which the two end faces are beveled toward the arc segment is approximately 45 degrees. The mold cores have a pivoting range of about 90 degrees.

The pivoting drive of the mold cores may comprise a sloped cam slot control which is formed by a drive rod which is movably horizontally and has a control pin which fits slidingly into the sloping slot of the mold core. A drive rod and at least one mold core are positioned on each mold wall of the mold cavity and the drive rods are attached to the inside of a common drive belt which is positioned around the mold and which is connected to the piston rod of a double-acting hydraulic cylinder. Preferably guide rollers are located on the four corners of the mold to control the movement and positioning of the drive belt.

In a modification of the invention the mold core is supported on the outer side of the mold and is pivotable about a vertical axis. Each mold core comprises a prismatic body with a triangular base surface and the vertical pivot axis of the mold core is in the area of the apex of the triangular base surface and the side of the mold core opposite the apex forms an arc segment with the center point of the circle coinciding with the vertical pivoting axis.

In this modification, the side wall of the mold core is positioned in a plane with the inner surface of the mold wall when the mold core is pivoted back into its retracted position. When the molded block is removed from the mold or when the mold is lifted a stripping action will be caused by the smooth walls of the mold and this will provide for a smooth and clean surface of the finished concrete block.

The gap or clearance between the edges of the side wall of the mold core and the inner surface of the mold wall when the mold core is in its retracted position is as small as possible to form a virtually continuous surface. The vertical axis is preferably disposed within the wall thickness of the mold wall. The mold core is provided with a lever which projects to the outside of the mold and is connected to a drive unit mounted on the outside of the mold wall. When a plurality of mold cores are used, the respective levers are connected to each other by a joint rod for the common drive.

A molded concrete block produced with the mold disclosed herein and which may be used as a floor surface is provided with projections on its side walls which are shaped as cylinder segments having triangular end faces with the cylinder axis of the segment being disposed within the molded block and extending horizontally and parallel to the side wall of the molded block. The outer boundary of the cylindrical segment is formed by an arc segment having a central axis coinciding with the cylinder axis and the end faces are beveled in the area of the arc segments so that on the end faces arches are formed with the shape of a segment of a truncated cone. The segment angle of the cylinder segment is about 80 degrees and the angle at which the end faces are beveled toward the arc segments is of the order of 45 degrees.

In addition to each projection on the side wall of the molded block there is a depression which corresponds in shape to the projection. It is preferred that there be one projection and one depression on each side of a rectangular concrete block to facilitate positioning of the blocks in forming a floor.

The self cleaning of the mold cores as disclosed in the present invention enables the cleaning intervals of the mold to be significantly increased and the production process is improved. The pivoting structure of the mold cores insures that all surfaces of the mold core which have come into contact with the concrete material within the mold cavity are stripped clean of such material upon pivoting back within the recess in the side wall of the mold. The surfaces of the concrete block produced in this manner are smoothed so that a clean, regular and dimensionally stable surface of the concrete block is achieved.

BRIEF DESCRIPTION OF THE SEVERAL VIEWS OF THE DRAWING

Other objects and advantages of the present invention will be apparent upon reference to the accompanying description when taken in conjunction with the following drawings, which are exemplary, wherein.

DETAILED DESCRIPTION OF THE INVENTION

Figure 1:
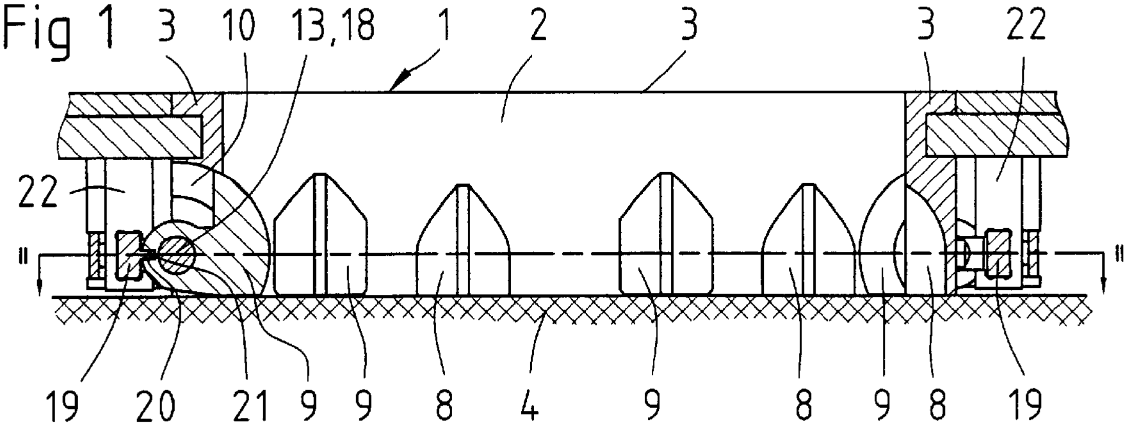
FIG. 1 is a sectional view taken along the line I—I in FIG. 2 showing the mold cores pivoted into the mold cavity.

Proceeding next to the drawings wherein like reference symbols indicate the same parts throughout the various views a specific embodiment and modification of the present invention will be described in detail.

FIGS. 1 to 7 show a mold 1 incorporating the present invention which comprises four mold cavities 2. Each mold cavity 2 has four vertical mold side walls 3. The mold 1 which is opened on its top and bottom is positioned on a board 4 of a vibrating table of a mold machine which is not shown. In the usual or conventional manner, the mold cavities 2 are filled with concrete or a similar suitable mixture and are closed by pressure plates which can be lowered and which are not shown in the drawing. After vibration of the mold 1 has been completed, the mold is lifted vertically and the finished concrete block 5 (see FIG. 10) is removed from the mold.

Figure 10:
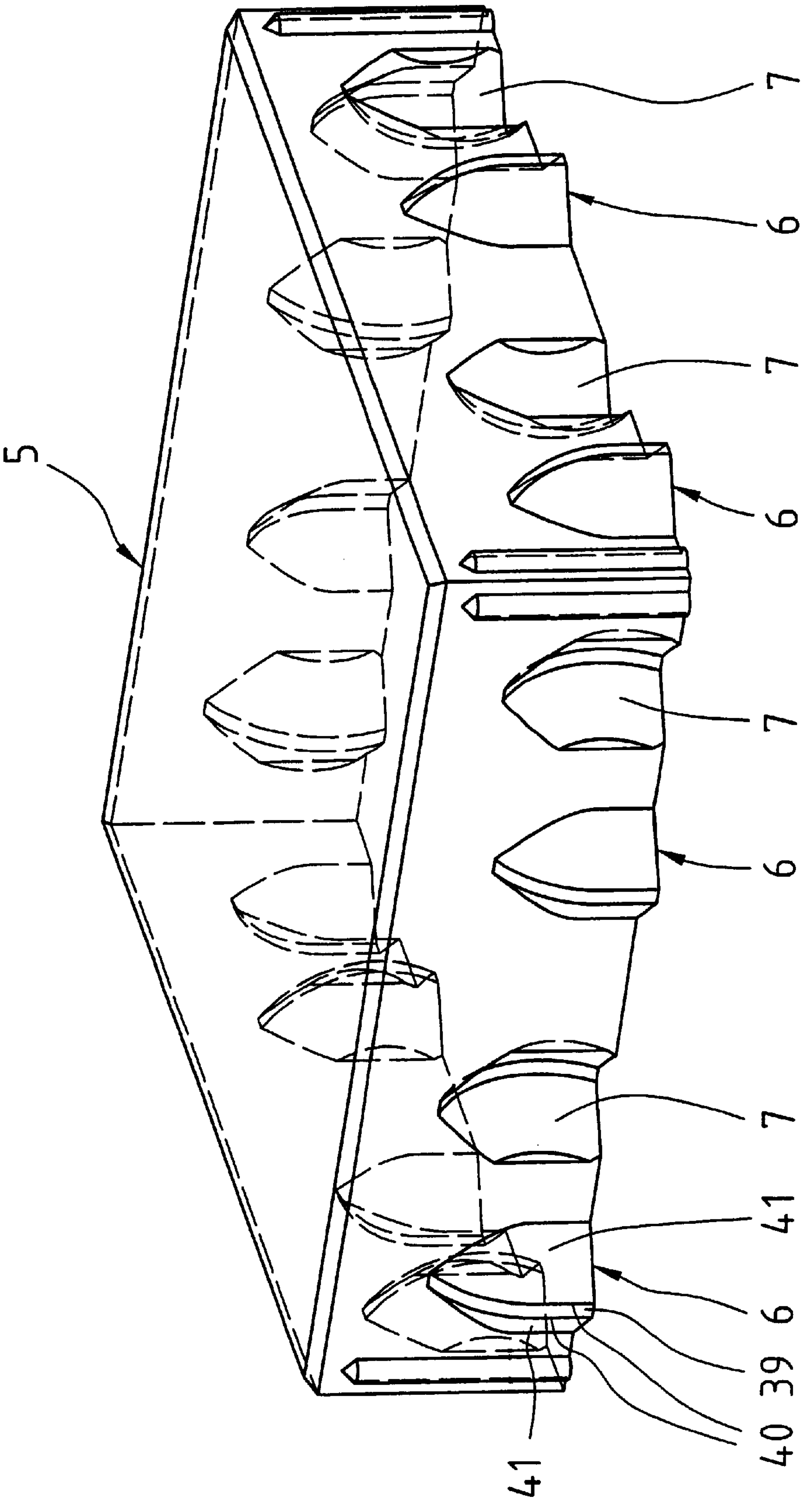
FIG. 10 is a perspective view of a concrete block which has been molded in the mold illustrated in FIGS. 1–7.

In order that the concrete blocks 5 which are produced with the mold 1 can be connected to each other into a form-fitted and force-fitted block combination when laid to form a surface, each concrete block 5 has on each of its four outer side walls projections 6 and depressions 7 which correspond in shape to the projections 6 and shown in FIG. 10. When the blocks are laid to form the surface the projections 6 fit into the depressions 7 of the adjacent concrete blocks 5. The projections 6 are molded onto the side walls of the concrete block in the conventional manner by the use of correspondingly shaped depressions 8 (FIG. 2) in the mold walls 3.

Figure 3:
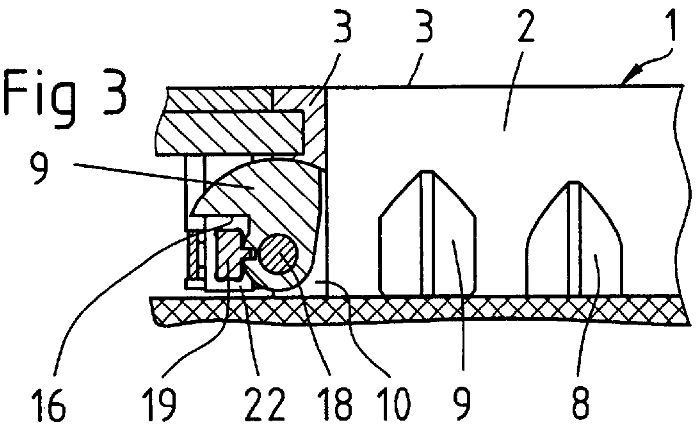
FIG. 3 is a portion of the mold shown in FIG. 1 with the mold core being pivoted out of the mold cavity and back into the recess.
Figure 4:
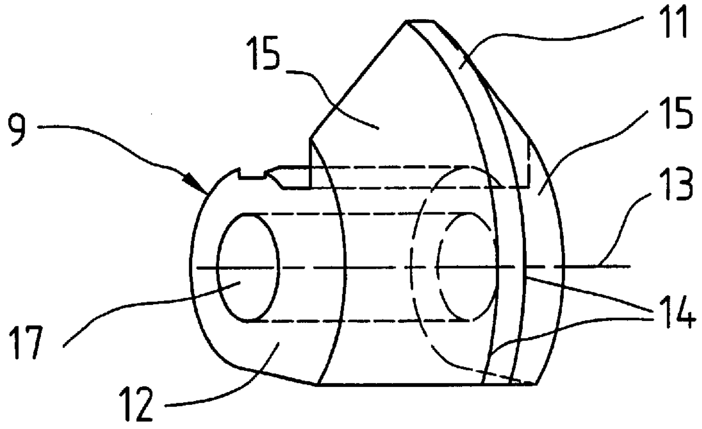
FIG. 4 is a perspective view of the cylinder segment-shaped mold core.
Figure 5:
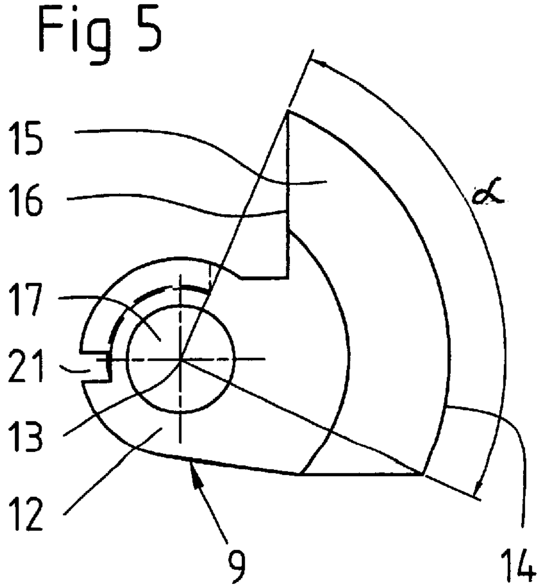
FIG. 5 is a side view of the mold core as shown in FIG. 4.
Figure 6:
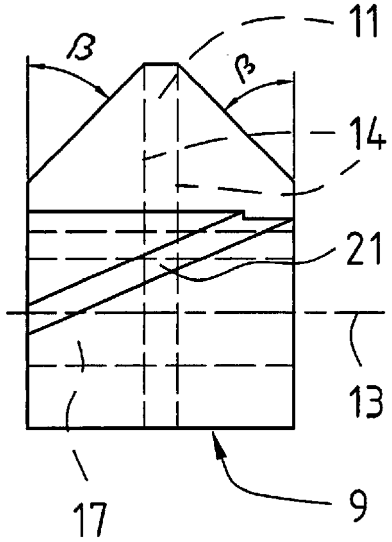
FIG. 6 is a front view of the mold core as shown in FIG. 4.

The depressions 7 which correspond to the shape of the projection 6 on the concrete block 5 are produced using correspondingly shaped mold cores 9 which project into the mold cavity 2 through one recess 10 at a time in the mold side walls 3. Each mold core 9 comprises a cylinder segment-shaped body 11 with a segment angle($\alpha$) which is substantially 90 degrees (FIG. 5). This structure thus forms triangular end faces 12 on the two ends of the body 11. The cylinder-segment body 11 has a horizontally disposed central axis 13 which also defines the axis about which the mold core 9 is pivoted. The side of the triangular end face 12 which is opposite from the pivot axis 13 forms an arc segment 14 with the pivot axis 13. The end faces 12 are beveled in the area of the arc segments 14 at an angle ($\beta$) of approximately 45 degrees so that on the two end faces 12 arches 15 each having the shape of a segment of a truncated cone are formed (FIG. 4). In order to minimize the space required by the mold core when it is pivoted back into its retracted position as shown in FIG. 3 one side of the body 11 is provided with a recess 16.

Figure 2:
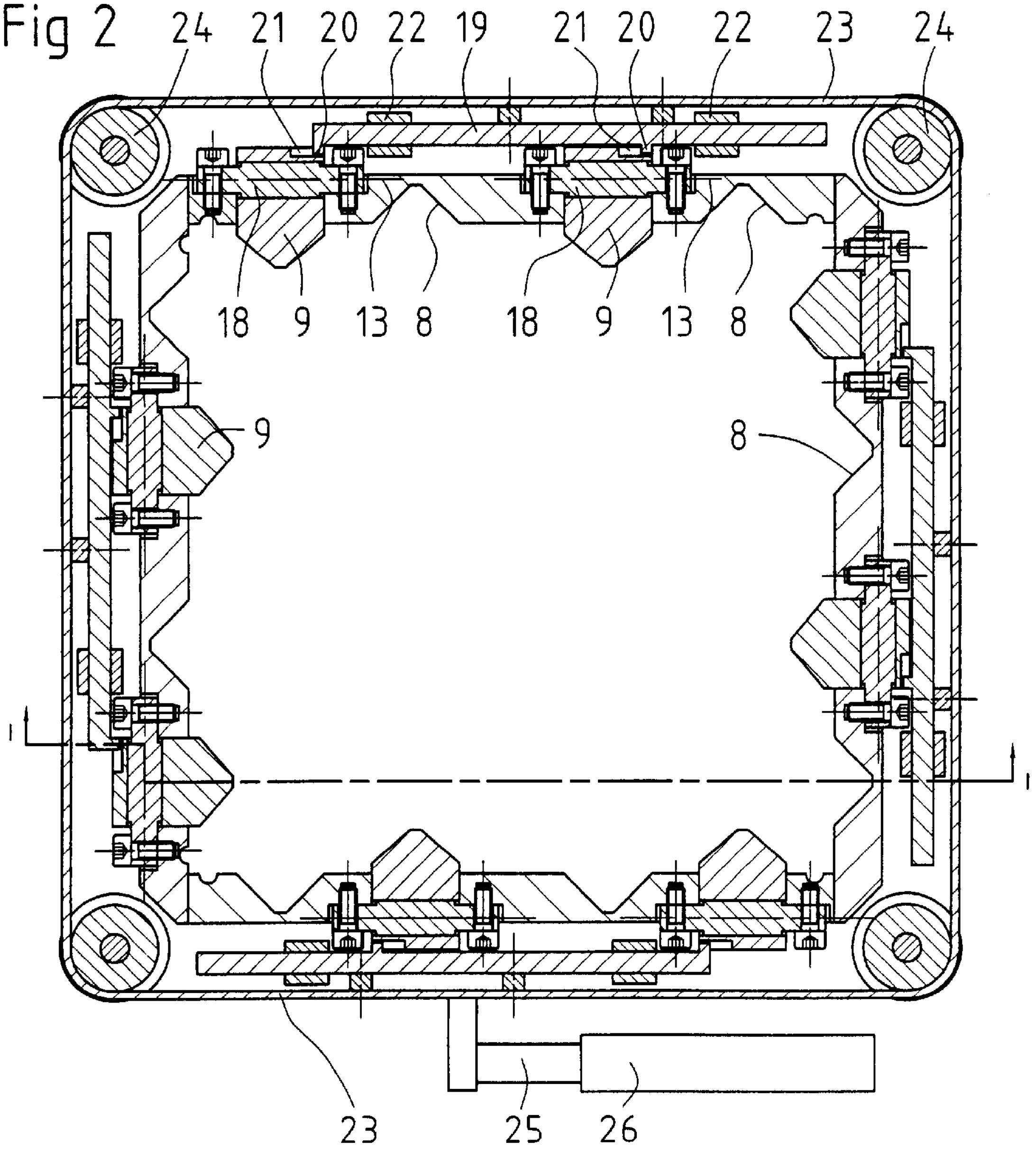
FIG. 2 is a sectional view taken along the line II—II in FIG. 1.

The mold core 9 is provided with a bore 17 having a central axis which coincides with the pivot axis 13 of the mold core. A bearing or journal pin 18 is received within the bore 17 and is attached to the outer side of the mold side wall 3 so as to extend horizontally and parallel to the mold side wall 3 as seen in FIG. 2. FIG. 2 also shows that on each mold side wall 3 two mold cores 9 are pivotally mounted and are fixed against axial movement so as to project through recesses 10 in the side wall 3 into the mold cavity 2. Immediately adjacent to each mold core 9 the mold side wall 3 is provided with a triangular depression 8 which corresponds in shape to the mold core 9 for producing the projection 6. In FIG. 3, the mold core 9 is shown in its pivoted back position in which the mold core is pivoted or retracted out of the mold cavity 2.

If the cylinder segment-shaped body 11 of the mold core 9 is not beveled on its end faces 12, the resulting mold core will not have the arches 15 and will not be triangular but will be rectangular in a longitudinal section. As a result, one or more pockets are formed on the side walls of the concrete block which are open to the bottom and rainwater will be collected in these pockets. Such rain pockets can be formed in the concrete block itself or in conjunction with the projection 6 and the depression 7.

The pivoting movement of the mold cores 9 is achieved by a sloping cam slot control which comprises a drive rod 19 having a control pin 20 which is slidably received into a cam slot 21 on the mold core as shown in FIGS. 2 and 5. The drive rod 19 is rectangular in cross-section and is slidably supported in bearings 22 on the outer side of the mold so as to be capable of horizontal movement. As shown in FIG. 2, a drive rod 19 is mounted on each mold side wall 3 and is drivingly connected to the mold cores 9 on a pertinent mold side wall by individual control pins 20. Each drive rod 19 is connected to the inner side of a drive belt 23 which is guided around the mold 1 on deflection rollers 24 mounted on the four corners of the mold 1. The outer side of the drive belt 23 is connected to a piston rod 25 of a double-acting hydraulic cylinder 26 which causes the drive belt 23 and thus all four drive rods 19 to move back and forth. The stroke of the hydraulic cylinder 26 is so selected that the mold cores 9 are pivoted forward and backward by means of the slope slot control 20–21 as shown in FIGS. 1 and 3. FIG. 3 also shows that the drive rod 19 is located in the recess 16 of the pivoted back mold core 9 so as to save space. In a multiple mold having four mold cavities 2 as shown in FIG. 7, there is provided a double-acting hydraulic cylinder 27 having two piston rods 25 each of which is connected to the two drive belts 23 of two adjacent mold cavities 2.

Figure 8:
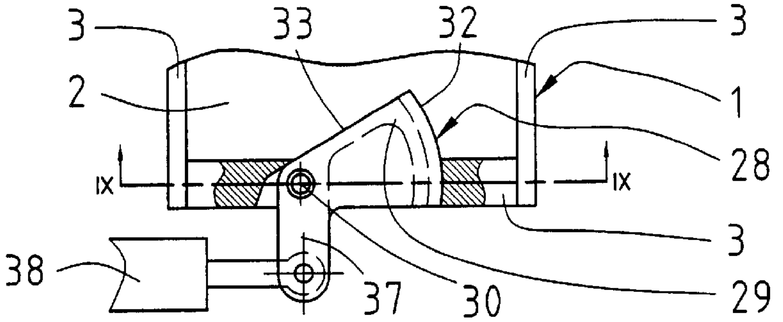
FIG. 8 is a partial plan view of a mold core of a modification wherein the mold cores are pivotable about a vertical axis.
Figure 9:
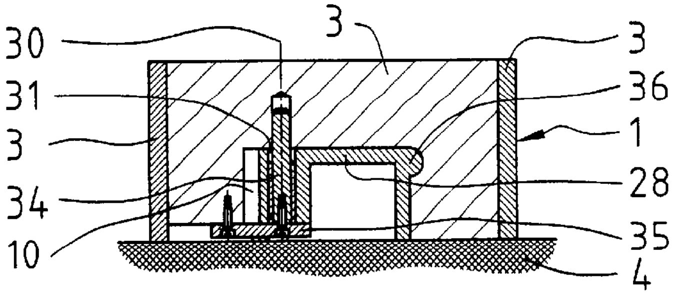
FIG. 9 is a sectional view taken along the line IX—IX in FIG. 8.

FIGS. 8 and 9 illustrate a modification of the invention in which a mold core 28 is pivoted around a vertical axis. The mold core 28 has a prismatic body with a triangular base surface 29. On the corner of apex of the base surface 29 there is a vertical pivot axis 30 which is formed by a bore 31 in the mold core 28. The side of the mold core 28 which is opposite from the pivot axis 30 is constructed as an arc segment 32 with the center of the circle coinciding with the pivot axis 30. The side wall 33 of the mold core 28 which faces the mold cavity 2 has a closed, flat smooth surface. A vertical bearing pin 34 is securely fixed into the mold wall 3 such that the free end of the pivot pin 34 projects into the recess 10 of the side wall 3 which is open to the bottom of the mold. The mold core 28 is slid onto the bearing pin 34 being received within the axial bore 31 and is secured against axial movement by a clip 35 which is detachably mounted on the one hand to the mold side wall 3 and on the other hand to the bottom end of the bearing pin 34. The clip 35 also functions to support the bearing pin 34.

The mold core 28 has on the top edge of the mold segment 32 a bead 36 which fits into a corresponding arc segment-shaped groove of the mold wall 3. In this manner, the mold core 28 is supported during the vibration and compaction process. In order to execute the pivoting movement of the mold core, a lever 37 which projects to the exterior of the mold is welded onto the mold core 28 and is connected to a drive unit 38 which comprises a hydraulic cylinder. For several mold cores 28, a plurality of individual levers 37 for a common pivoting drive may be connected to one another by a joint rod which is not shown in the drawings.

Figure 7:
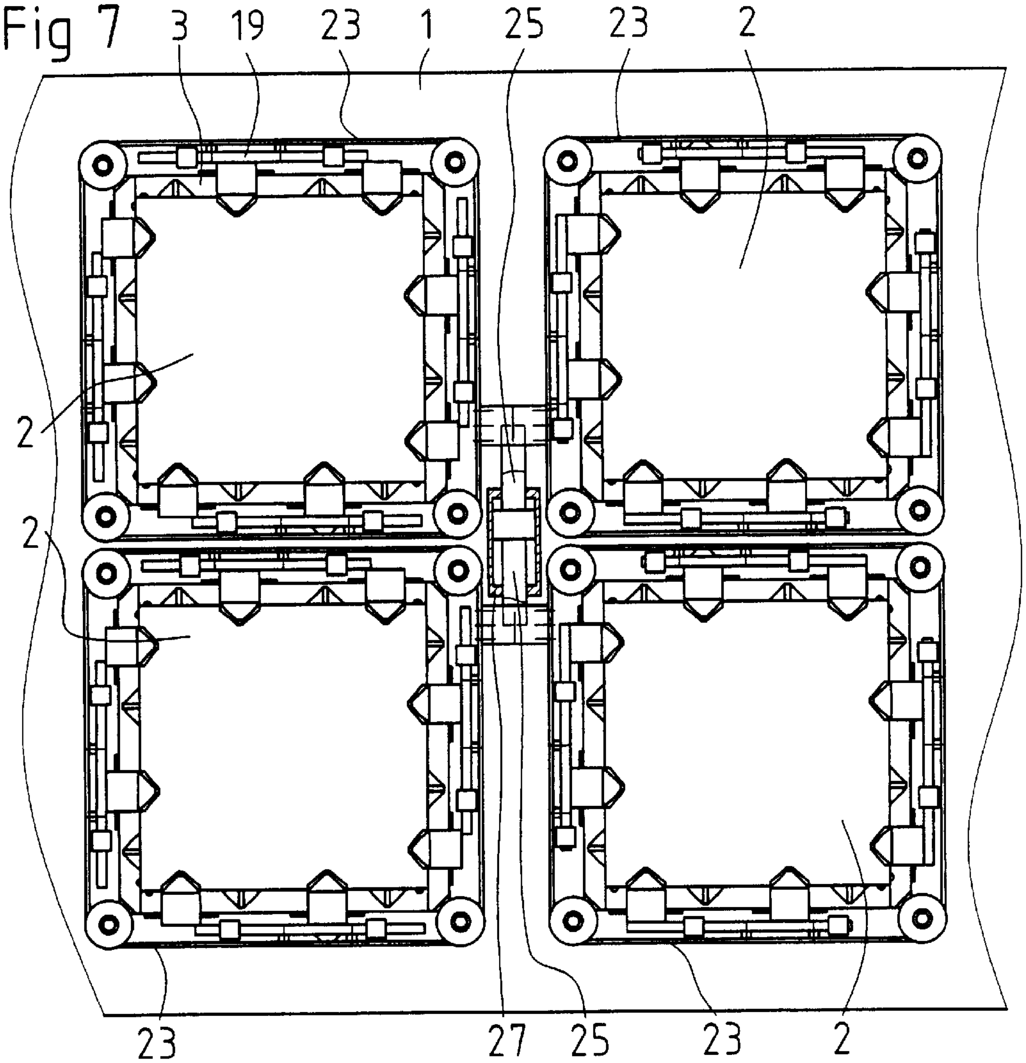
FIG. 7 is a bottom plan view of a multiple mold assembled from molds according to FIGS. 1–6 and also showing the pivoting drive for the mold cores which are pivoted into the mold cavities.

Prior to filling the mold cavities 2 with the concrete molding material the mold cores 9 and 28 are pivoted into the mold cavities as shown in FIGS. 7 and 8. After filling and vibrating the mold 1 the mold cores 9 and 28 are retracted or pivoted back by actuating the hydraulic cylinders 26, 27 or the drive unit 38 and as a result, the depressions 7 are formed on the outer walls of the concrete blocks 5. While the mold cores 9 and 28 are being pivoted back, any concrete residue adhering to the mold cores are stripped by the inner boundary edges of the recess 10 so that an automatic self-cleaning of all surfaces of the mold core 9 which have come into contact with the concrete molding material has been performed. In the modification shown in FIGS. 8 and 9, the mold cores 28 are pivoted back until the side wall 33 of the mold core which faces the mold cavity 2 is not stripped when the mold core 27 is pivoted back but lies in the same plane as the surface of the inner side wall 3. (FIT. 8) In this manner, during removal of the block from the mold or when the mold is being raised self-cleaning of the side wall 33 of the mold core 28 will occur together with a simultaneous smoothing of the surface of the concrete block 5.

FIG. 10 shows the completely molded concrete block 5 which was produced with the mold shown in FIGS. 1–7. According to the configuration of the mold cores 9, each projection 6 on 1 the side walls of the concrete block 5 is formed as a cylinder segment 39 with a cylindrical axis within the concrete block 5 and this axis extends horizontally and parallel to the mold side wall 3. The outer surface of the cylinder segment 39 is formed by two arc segments 40 which are parallel and which have center points which also coincide with the cylinder axis. The triangular shape of the projection 6 is achieved by the end faces of the cylinder segment 39 being beveled at an angle of 45 degrees up to the arc segments 40. On both sides of each projection 6 the beveling of the cylinder segment 39 results in three-dimensional arches 41 which insure and especially stable form-fitted and force-fitted connection and good transfer of forces and stresses between the concrete blocks 5 after they have been assembled or laid in position.

Figure 11:
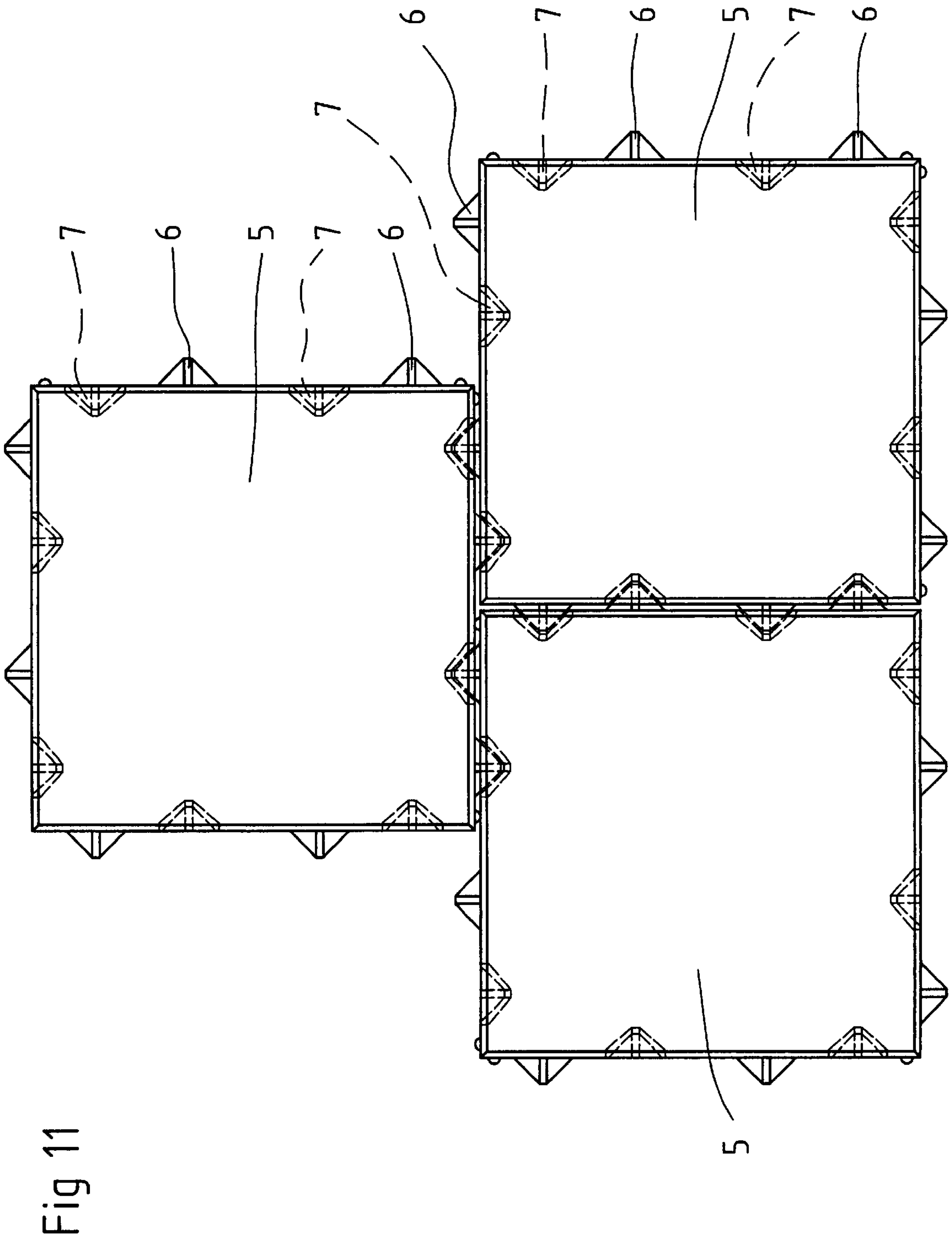
FIG. 11 shows an assembly of the concrete blocks illustrated in FIG. 10 when they are laid to define a floor surface.

The embodiment of the concrete block 5 as shown in FIG. 10 which has two projections 6 and two depressions 7 arranged in pairs on each side wall of the concrete block permits a laying pattern in which adjacent concrete blocks are offset from each other by one half their length as shown in FIG. 11. The projections 6 which are beveled at 45 degrees also facilitate joining or connection of adjacent concrete blocks. Thus, for example, another concrete block can be inserted and joined at an insertion angle of 45 degrees without difficulty into the 90 degree gap which is formed between the first concrete block and the second and third concrete block.

Thus, it can be seen that the present invention has disclosed a mold in which depressions can be formed in the side walls of a molded block by pivotably movable mold cores which are self-cleaned of any concrete residue when the mold cores are pivoted back into a retracted position to enable removal of a molded block from the mold.

It will be understood that this invention is susceptible to modification in order to adopt it to different usages and conditions, and, accordingly, it is desired to comprehend such modifications within this invention as they fall within the scope of the appended claims.

What is claimed is:

1. A mold for producing a molded article from concrete or a like material comprising side walls defining at least one mold cavity therein, there being one or more recesses in said side walls, one or more mold cores and each pivotally supported within a said recess, means, on said mold for pivoting said mold cores into a first position to project into the mold cavity to form depressions in the side walls of a concrete block produced therein and into a second position back into said recesses and said means for pivoting having a pivot axis at least partially contained within said recess.

2. A mold as claimed in claim 1 wherein each of said mold cores has an outer contour surface, each said recess has an opening in a said side wall which closely fits a said mold core contour surface so as to strip mold material from said contour surface when a said mold core is pivoted back into its second position.

3. A mold as claimed in claim 1 wherein said mold cores are pivotally supported on a horizontal axis on the outer side of a said mold.

4. A mold as claimed in claim 1 wherein each said mold core comprises a body having the shape of a segment of a cylinder with substantially triangular end faces, said end faces each having an apex in the area of the axis of pivoting of said cylindrical segment body and further having a side opposite said apex defining an arc segment.

5. A mold as claimed in claim 4 wherein the segment angle (α) of said cylindrical segment body is substantially 90 degrees.

6. A mold as claimed in claim 4 wherein said end faces each further being beveled in the vicinity of a said arc segment to define arches each having the shape of a truncated cone segment on a said end face.

7. A mold as claimed in claim 6 wherein said end faces each being beveled at an angle (β) of substantially 45 degrees toward the arc segment.

8. A mold as claimed in claim 3 wherein said mold cores are pivotable about said horizontal axis in both directions within a limited angle.

9. A mold as claimed in claim 8 wherein said angle of pivoting is substantially 90 degrees.

10. A mold as claimed in claim 1 wherein said means for pivoting comprises a drive rod being slidably mounted for horizontal movement and having a control pin thereon which is received within a sloping cam slot on a said mold core.

11. A mold as claimed in claim 10 wherein a said drive rod and a said mold core being mounted on each mold wall of the mold cavity, a drive belt positioned around the mold and connected to a piston rod of a double-acting hydraulic cylinder, each said drive rod being connected to an inner surface of said drive belt.

12. A mold as claimed in claim 11 wherein said mold has four corners and a guide roller on each said corner to movably support said drive belt.

13. A mold as claimed in claim 11 and comprising four of said mold cavities assembled in pairs to define a multiple mold, said double-acting hydraulic cylinder having two piston rods and each piston rod connected to the two drive belts of two adjacent mold cavities.

14. A mold as claimed in claim 1 wherein said mold cores are each pivotable about a vertical axis.

15. A mold as claimed in claim 14 wherein said mold core comprises a prismatic body with a triangular base surface having an apex, the vertical pivoting axis located in the area of said apex, said triangular base surface having an arcuate shaped side opposed from said apex and said center of said arcuate side located on the vertical pivoting axis.

16. A mold as claimed in claim 15 wherein said mold core further has a surface facing toward the mold cavity which defines a plane with the inner face of a mold side wall when the mold core is pivoted back into said second position.

17. A mold as claimed in claim 15 wherein said vertical axis comprises a vertical bearing disposed within the wall thickness of the mold side wall.

18. A mold as claimed in claim 15 wherein said mold core has a lever projecting therefrom to the exterior of the mold, and a drive unit mounted on the outer surface of the mold wall and connected to said lever.

19. A mold as claimed in claim 18 wherein there is a plurality of mold cores each having a lever, said drive unit having a joint rod extending therefrom and connected to said levers so as to provide a common drive.

* * * * *